United States Patent [19]

Bove

[11] 4,022,739

[45] May 10, 1977

[54] COMPOSITION FOR PLUGGING BLAST-FURNACE TAP-HOLE

[75] Inventor: Fred Bove, Warken, Luxembourg

[73] Assignee: Terrac Company Limited, Great Britain

[22] Filed: Oct. 23, 1975

[21] Appl. No.: 625,089

Related U.S. Application Data

[63] Continuation-in-part of Ser. No. 468,173, May 8, 1974, abandoned.

[30] Foreign Application Priority Data

June 6, 1973 Luxembourg .................... 67749

[52] U.S. Cl. ................ 260/28.5 C; 106/56; 260/28 P; 260/37 EP; 260/38

[51] Int. Cl.² ......................................... C08L 95/00

[58] Field of Search ........... 106/56; 260/28, 28.5 C

[56] References Cited

UNITED STATES PATENTS

| | | | |
|---|---|---|---|
| 2,709,659 | 5/1955 | Werking | 106/56 |
| 3,007,805 | 11/1961 | Cline | 106/56 X |
| 3,607,809 | 9/1971 | Elby | 106/56 X |
| 3,664,853 | 5/1972 | Leonard et al. | 106/56 X |
| 3,689,299 | 9/1972 | Brown et al. | 106/56 X |

Primary Examiner—Donald E. Czaja
Assistant Examiner—S. M. Person
Attorney, Agent, or Firm—Robert E. Burns; Emmanuel J. Lobato; Bruce L. Adams

[57] ABSTRACT

A composition for plugging the tap holes of blast furnaces consists essentially of about 70% to 85% of a mineral component comprising refractory clay, a granular refractory aggregate having a high mechanical strength and a high-carbon mineral material, and a polymerizable hydrocarbon binder comprising a hydrocarbon derivative derived from the distillation of crude petroleum oil and having an initial boiling point higher than 200° C, a thermosetting resin which is stable at temperatures of the order of 200° C and is of such composition that the beginning of the mass setting process can be adjusted from 130° C up, or a combination of such hydrocarbon derivative and resin. The composition may also contain a secondary binder comprising a high-carbon material such as coal tar pitch or petroleum oil pitch which is solid at 20° C, has a high coking capacity and is adapted to mix up with the polymerizable hydrocarbon binder at temperatures within the range of 130° C to 200° C.

20 Claims, No Drawings

COMPOSITION FOR PLUGGING BLAST-FURNACE TAP-HOLE

REFERENCE TO PRIOR APPLICATION

This application is a continuation-in-part of my application Ser. No. 468,173 filed May 8, 1974 and now abandoned.

BACKGROUND OF THE INVENTION

The present invention relates in general to blastfurnace tap-hole plugging mix compositions and has specific reference to an improved plugging mix of this character.

It is known notably through Werking U.S. Pat. No. 2,709,659 to use a product comprising about 80% of clay and ground brick, and a binder consisting:
-either of 10 to 12% of coal tar and 5 to 7% of an aldehyde such as furfuraldehyde,
-or 15 to 25% of phenol resin with an acid or basic catalyst additive.

Unfortunately, this mix sets very rapidly in the plugging machine cylinder, thus requiring the dismantling thereof after each cast. This causes a considerable loss of time. On the other hand, in the first case the tar is burned and the noxious vapours thus released surround the tap-hole and mud-gun. Besides, the considerable proportion of light organic substances leads in actual practice to serious inconveniences such as projections, flames, etc.

It is also known through the papers published by Dr. Walter HORN in "Stahl und Eisen", Volume 23, pages 1497 to 1502 to prepare an anhydrous tap-hole plugging mix comprising 70% of silicious clay, 10% coal or coke, and 20% tar. However, the coking process is relatively slow, large amounts of tar vapours are released and the uncured tar produces dangerous cast-iron projections.

To avoid these inconveniences it is know through Elliy U.S. Pat. No. 3,607,809 to employ a tap-hole plugging mix comprising 70% of a mixture of sand and clay in such proportions that the percentage of alumina is 1 or 2% above the eutectic value, 10% of ground coal or coke, a binder consisting of only 15 to 17% of liquid tar plus 3 to 4% of a liquid resin thermostable up to 200° F (392° F) derived from the amino or phenoplast group, and 1 to 3% of a setting retarding agent. With this composition a rapid coking or carbonization, of the order of 10 to 15 minutes, a very low release of noxious tar vapour, a negligible deposit in the plugging machine cylinder and no cast-iron projections whatsoever were observed.

The explanation of the phenomenon having led to such advantageous results is that certain amino or phenoplast substances constitute a kind of carbonaceous skeleton in which all the tar is burned off.

However, a certain degree of release of coal tar fumes is still observed during the plugging operation due to the excess mix falling into the hot trough, these fumes creating discomfort to the founders during the cleaning of this trough.

Now, it was found, according to the present invention, that a tap-hole plugging mix composition could be developed which provides results at least as satisfactory as those obtained with the above-defined anhydrous mixes while eliminating or significantly reducing any release of noxious fumes.

DESCRIPTION OF THE PREFERRED EMBODIMENT

The blast-furnace tap-hole plugging mix composition in accordance with the present invention comprises essentially about 70% to 85% of a mineral component or "filler" comprising refractory clay, a refractory aggregate having a high mechanical strength and a high-carbon material, and 15 to 30% of a hydrocarbon binder. While the proportions of clay, refractory aggregate and high-carbon material in the filler may vary considerably according to the conditions of the tap-hole in which the mix is to be used, it has been found desirable to use approximately the following proportions: clay 15% to 30%, refractory aggregate 30% to 45% and high-carbon material 10% to 25%.

The clay component of the filler comprises a single clay or a mixture of clays of which the fusion point is above 1450° C and of which the alumina content is between 4% and 42%. By way of example, the clay component comprising 25% of the tap-hole plugging composition may be a mixture of clays comprising 20 parts of clay having an alumina content of 30% and a fusion point of 1640° C and 80 parts of clay having an alumina content of 8% and a fusion point above 1450° C.

The refractory aggregate comprises high strength inert granular material such as high density silicious sand, chamotte, corundum, magnesia, dolomite, silicon carbide, bauxite, mullite, sillimanite, etc. By way of example, the refractory aggregate comprising 41% of the tap-hole plugging mix composition may comprise chamotte having a grain size of 2 mm, an alumina content of 42% and a fusion point of 1770° C. The high-carbon material comprises powdered or granulated material consisting primarily of carbon such as soft coal, hard coal, coke dust, graphite, crushed scrap carbon electrodes, etc. An example of high-carbon material comprising 15% of the tap-hole mix composition is anthracite having 4% of volatile material and 6% of ash.

The hydrocarbon binder consists of a hydrocarbon derivative having a temperature of initial distillation higher than 200° C and selected from the group consisting of saturated or unsaturated hydrocarbons derived from the distillation of crude oil and a thermosetting resin capable of preserving its stability at temperatures up to 200° C. The hydrocarbon derivative preferably has a viscosity between 20 and 100 centipoise at 100° C. The thermosetting resin is of such composition that initiation of the setting process of the mix can be adjusted from 130° C up. Thus, for example in known manner, the resin composition may include an accelerator, moderator or inhibitor of the speed of polymerization, for example by reason of the presence of free radicals such as acid anhydrides, amines, hydroxyles which act as an accelerator or hydroquinone, cobalt phthalate etc. which act as inhibitors.

Moreover, when the hydrocarbon binder comprises both a thermosetting resin and a hydrocarbon derivative, the respective proportions of the resin and the hydrocarbon derivative are selected so as to obtain at the time of use of the mix a hardening which is more or less rapid as a function of the characteristics and operation of the blast-furnace. Thus, the range of proportions of the two components are selected according to the following three conditions:

1. Very rapid hardening

Thermosetting resin 45% to 85%
Hydrocarbon derivative 15% to 55%
2. Rapid hardening
   Thermosetting resin 20% to 45%
   Hydrocarbon derivative 55% to 80%
3. Medium hardening
   Thermosetting resin 5% to 20%
   Hydrocarbon derivative 80% to 95%

As an example of a tap-hole plugging mix compositions for use under conditions in which rapid hardening is desired, the hydrocarbon binder comprising 17% of the composition comprises 5% of thermosetting resin and 12% of a hydrocarbon derivative. Thus, the proportion of thermosetting resin to hydrocarbon derivative in the hydrocarbon binder is approximately 30% to 70%.

In addition to the hydrocarbon binder, which may be considered as a primary binder, the tap-hole plugging mix composition in accordance with the present invention may also include a secondary binder comprising a high-carbon solid material having a high coking capacity and adapted to mix with the primary binder at temperatures within the range of 130° C to 200° C. The combination of constituents of the composition is such that the initial temperature can be so adjusted that the plugging mix will set a temperature of 130° C or at a higher temperature determined as a function of the stresses deriving from variable conditions of use contemplated for the tap-hole plugging mix composition.

The proportion of the component elements in the tap-hole plugging mix may vary within the following limits which are given by way of example and not of limitation.

| Mineral Component | 70% to 85% |
|---|---|
| Hydrocarbon Binder | 5% to 20% |
| Secondary Binder | 0% to 15% |

This plugging mix composition is characterized by the following advantageous features:
1. Its plasticity remains substantially unchanged during storage due to the virtual absence of volatile products thus eliminating any trouble during the plug injection operation;
2. The plugging mix does not harden inside the plugging machine cylinder where the temperature is of the order of 60° C to 80° C;
3. On the other hand, the setting of the plugging mix in the tap-hole where the temperature exceeds 200° C is accelerated so that the plugging machine can be withdrawn after only 10 minutes;
4. The chemical setting of the binder prevents the presence of gas inclusions such as are experienced with previously known plugging mixes, a phenomenon due to the evaporation and subsequent cracking of the tar component of such known composition;
5. The setting of the tap-hole plugging mix composition due to its inherent rapidity affords on the one hand a maximum yield in the coking of the organic substances and on the other hand a very satisfactory resistance to erosion by the cast iron and slag;
6. The elimination or significant reduction of noxious vapours released from the tap-hole plugging mix composition during setting.

In the hydrocarbon binder comprising a thermosetting resin and a hydrocarbon derivative, the thermosetting resin may be selected from among:
1. Formophenolic resins of the formula:

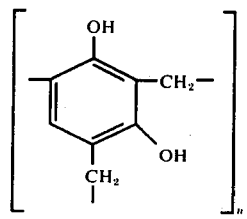

As example of a suitable formophenolic resin in Cascophen (Borden Chemical Company, USA);
2. Furanic resins of the formula:

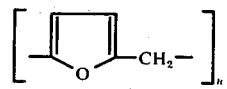

Examples of suitable furanic resins are Duralon (U.S. Stoneware Co.), and Furfurylic alcohol (Rhode Poulenc France);
3. Aminoplast resins including:

a) urea formaldehyde resins of the formula:

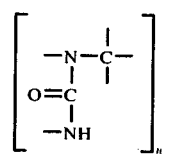

b) melamine formaldehyde resins of the formula:

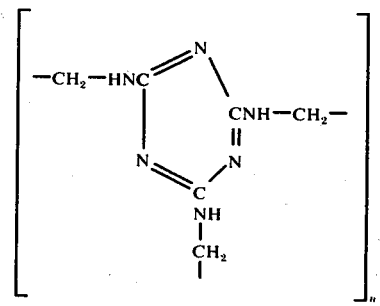

An example of a suitable aminoplast resin in Cibamine (Ciba in Switzerland);
4. Polyester resins of the formula:

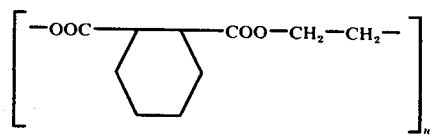

An example of a suitable polyester resin is Norsodyne (C.D.F. Chimie France);
5. Epoxy resins of the formula:

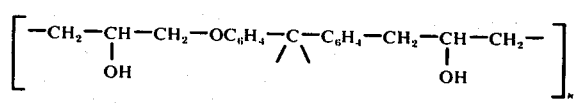

An Example of a suitable epoxy resin is Epikote (Shell);

6. Indene-coumarone resins of the formula:

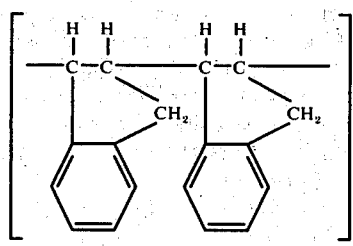

An example of a suitable indene-coumarone resin is Necires (N.C.C. Holland);

7. Natural resins, for example Cellobon (Graham, France).

The hydrocarbon derivative can be chosen from among:

1. Products derived from the distillation of crude petroleum and in particular:
   a. a non-paraffinic extract obtained by the treatment of the distillates of crude petroleum under vacuum with a selective solvent such as phenol, nitrobenzene or furfural;
   b. a bituminous binder obtained by the direct distillation of crude petroleum and of which the temperature at which distillation begins is above 250° C under a pressure of 760 mm of mercury.

2. Natural oils such as linseed oil and castor oil.

The secondary binder when used is characterized by being in a solid state at 20° C, and having a substantial carbon content and a high coking capacity. It may for example be chosen from among:

1. The pitch obtained by the distillation of tar having a Kramer and Sarnow softening point above 75° C, and a fixed carbon content above 30%.

2. The pitch obtained by the distillation of crude petroleum having a Kramer and Sarnow softening point above 100° C, and a fixed carbon content above 30%.

A few examples of tap-hole plugging mix compositions in accordance with the invention are given hereunder by way of illustration:

EXAMPLE 1

30% clay
37% sand
7% pitch
12% porous ground soft coal
9% phenolformaldehyde resin
5% liquid polyepoxy resin

EXAMPLE 2

30% sand
25% clay
5% petroleum pitch
15% ground coke
10% corundum
9% furan resin
6% liquid coumarone resin

EXAMPLE 3

45% sand
25% clay
5% solid coumarone
10% ground soft coal
10% phenolic resin (resol-formaldehyde)
5% castor oil

EXAMPLE 4

40% clay
15% sand
10% silicon carbide
15% amorphous carbon
10% formophenol resin
5% petroleum oil

EXAMPLE 5

20% clay
55% amorphous carbon
5% graphite
12% furfuryl resin
4% liquid coumarone resin

EXAMPLE 6

30% clay with an alumina content of 18%
35% sand with a silica content of 98%
20% porous ground soft coal with 25% of volatile material
15% petroleum oil distillation products as defined above

EXAMPLE 7

35% chamotte with 42% alumina
30% clay containing 18% alumina
20% soft coal containing 25% of volatile material
15% petroleum oil distillation products as defined above associated with epoxy resin

EXAMPLE 8

35% calcined bauxite containing 88% alumina
25% clay containing 22% alumina
10% hard coal containing 4% volatile material
15% soft coal containing 25% volatile material
15% petroleum oil distillation products as defined above associated with Necires resin (indene-coumarone resin made by N.C.C., Holland)

EXAMPLE 9

15% clay having an alumina content of 30%
50% magnesia containing 80% MgO
10% soft coal containing 25% volatile material
10% graphite
15% petroleum oil distillation products as defined above associated with Cascophen resin (formophenolic resin made by Borden Chemical Co., USA)

EXAMPLE 10

30% clay having an alumina content of 25% 20% corundum having an alumina content of 99%
15% silicon carbide
15% hard coal containing 4% of volatile material
5% coal tar pitch
15% petroleum oil distillation products as defined above associated with Epikote resin (epoxy resin supplied by Shell)

While a number of examples have been given to illustrate tap-hole plugging mix compositions in accordance with the invention, it will be understood that the invention is in no way limited to these examples.

What I claim and desire to secure by Letters Patent is:

1. Blast-furnace tap-hole plugging mix composition consisting essentially of about 70% to 85% of a mineral component comprising refractory clay, a refractory aggregate having a high mechanical strength and a high-carbon mineral material, and of a polymerizable hydrocarbon binder selected from the group consisting of a hydrocarbon derivative derived from the distillation of crude petroleum oil and having an initial boiling point higher than 200° C, and a thermosetting resin which is stable at temperatures of the order of 200° C and is of such composition that the beginning of the mass setting process can be adjusted from 130° C up, said hydrocarbon derivative comprising at least 5% of said composition.

2. A composition according to claim 1, in which said polymerizable hydrocarbon binder constitutes a primary binder, said composition further comprising a high-carbon secondary binder which is solid at 20° C, has a high coking capacity and is adapted to mix up with said primary binder at temperatures within the range of 130° C to 200° C.

3. A composition as set forth in claim 1, wherein said hydrocarbon derivative is selected from the group consisting of non-paraffinic extracts from the distillation of crude petroleum oil.

4. A composition as set forth in claim 1, wherein said hydrocarbon derivative is selected from the group consisting of residues of the direct distillation of crude petroleum oil and having an initial boiling point higher than 200° C.

5. A composition as set forth in claim 1, wherein said thermosetting resin is selected from the group consisting of aminoplast resins.

6. A composition as set forth in claim 1, wherein said thermosetting resin is selected from the group consisting of polyester-type resins.

7. A composition as set forth in claim 1, wherein said thermosetting resin is selected from the group comprising furanic-type resins.

8. A composition as set forth in claim 1, wherein said thermosetting resin is an epoxy resin.

9. A composition as set forth in claim 1, wherein said thermosetting resin is a coumarone-indene resin.

10. A composition as set forth in claim 1, wherein said thermosetting resin is selected from the group consisting of natural resins.

11. A composition as set forth in claim 1, wherein said thermosetting resin is selected from the group consisting of phenolic resins.

12. A composition as set forth in claim 2, wherein said secondary binder consists of coal tar pitch.

13. A composition as set forth in claim 2, wherein said secondary binder consists of petroleum oil pitch.

14. A plugging composition for the tap-holes of blast-furnaces, which consists essentially of 30% of refractory clay, 35% of sand, 20% of ground porous soft coal and 15% of petroleum oil associated with a phenolic resin.

15. A plugging composition for the tap-holes of blast-furnaces, which consists essentially of 35% of refractory fire-clay, 30% of sand, 20% of soft coal and 15% of petroleum oil associated with an epoxide resin.

16. A plugging composition for the tap-holes of blast-furnaces, which consists essentially of 35% of calcinated bauxite, 25% of clay, 10% of hard coal, 15% of ground soft coal and 15% of petroleum oil associated with an indene-coumarone resin.

17. A plugging composition for the tap-holes of blast-furnaces, which consists essentially of 15% of clay, 10% of soft coal, 50% of magnesia, 10% of graphite and 15% of petroleum oil associated with a phenolic resin.

18. A plugging composition for the tap-holes of blast furnaces, which consists essentially of 30% of clay, 20% of corundum, 15% of silicon carbide, 15% of hard coal, 5% of coal-tar pitch and 15% of petroleum oil associated with an epoxide resin.

19. Blast-furnace tap-hole plugging mix composition consisting essentially of a mineral component, a primary binder and a secondary binder in the following proportions:

| | |
|---|---|
| mineral component | 70% to 85% |
| Primary binder | 5% to 20% |
| Secondary binder | up to 15% | said mineral component comprising refractory clay, a refractory aggregate having a high mechanical strength and a high carbon mineral material;

said primary binder being a polymerizable hydrocarbon binder selected from the group consisting of (1) a hydrocarbon derivative derived from the distillation of crude petroleum oil and having an initial boiling point higher than 200° C and (2) a thermosetting resin which is stable at temperatures of the order of 200° C, the proportion of hydrocarbon derivative in said primary binder being at least 15% of the primary binder;

said secondary binder being a material which is in a solid state at 20° C and has a substantial carbon content and a high coking capacity, said material being selected from the group consisting of (1) pitch obtained by the distillation of coal tar and (2) pitch obtained by the distillation of crude petroleum;

the combination of constituents of said composition being selected to set at a selected temperature not lower than 130° C.

20. A composition as set forth in claim 1, wherein said hydrocarbon derivative comprises about 15% of said composition.

* * * * *